United States Patent
Martin et al.

(10) Patent No.: US 7,128,999 B1
(45) Date of Patent: Oct. 31, 2006

(54) SYSTEM OF RETAINING A PLURALITY OF BATTERIES FOR AN ELECTRIC/HYBRID VEHICLE

(75) Inventors: Gregory A. Martin, Indianapolis, IN (US); Robert L. Stinefield, Alexandria, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/523,881

(22) Filed: Mar. 13, 2000

(51) Int. Cl.
*H01M 2/10* (2006.01)

(52) U.S. Cl. .................. 429/99; 429/100; 429/186
(58) Field of Classification Search .............. 429/100, 429/99, 156, 186
See application file for complete search history.

(56) References Cited

U.S. PATENT DOCUMENTS

| | | | | | |
|---|---|---|---|---|---|
| 5,392,873 | A | * | 2/1995 | Masuyama et al. | 429/99 X |
| 5,534,364 | A | * | 7/1996 | Watanabe et al. | 429/99 X |
| 5,639,571 | A | * | 6/1997 | Waters et al. | 429/99 X |
| 5,736,272 | A | * | 4/1998 | Veenstra et al. | 429/99 |
| 5,886,501 | A | * | 3/1999 | Marks et al. | 429/99 X |

* cited by examiner

*Primary Examiner*—John S. Maples
(74) *Attorney, Agent, or Firm*—Christopher DeVries

(57) ABSTRACT

A battery tray apparatus for receiving and retaining a plurality of batteries includes a body portion having a length and a width. The body portion includes a plurality of first ridge portions extending along the length of the body portion and a plurality of second ridge portions extending along the width of the body portion. The plurality of second ridge portions intersects the plurality of first ridge portions. The plurality of first ridge portions and the plurality of second ridge portions define a plurality of recessed portions for receiving the plurality of batteries and preventing movement of the plurality of batteries relative to the body portion.

15 Claims, 3 Drawing Sheets

SYSTEM OF RETAINING A PLURALITY OF BATTERIES FOR AN ELECTRIC/HYBRID VEHICLE

FIELD OF THE INVENTION

This invention relates generally to the field of electric/hybrid vehicles and in particular, to a system and method of retaining a plurality of batteries for an electric/hybrid vehicle.

BACKGROUND OF THE INVENTION

Electric/hybrid vehicles typically include a plurality of batteries to provide a source of energy for the vehicle. These batteries are tightly grouped together in order to save space within the vehicle, and are typically secured to a mounting structure that in turn is mounted to the vehicle.

Conventional mounting structures typically consist of a number of piece parts, each of which are formed from advanced composite materials in order to save weight, which is an important design requirement with electric/hybrid vehicles. However, there are several disadvantages to these conventional multi-piece advanced composite structures. For example, the fabrication of each of the parts from composite materials is a complicated, time-consuming and costly process, which adds a considerable amount of cost to the vehicle. Moreover, the assembly of the various piece parts is also a complicated and time-consuming process, which also increases the overall cost of the vehicle. In addition, there is a much higher probability of failure of the mounting structure due to separation at the joints where various composite parts are fastened together. Finally, the large number of holes that are typically required in the composite piece parts reduces the strength of the overall structure.

Accordingly, it would be desirable to have a system and method of retaining a plurality of batteries for an electric/hybrid vehicle that overcomes the disadvantages described.

SUMMARY OF THE INVENTION

One aspect of the invention provides a battery tray apparatus for receiving and retaining a plurality of batteries including a body portion having a length and a width. The body portion includes a plurality of first ridge portions extending along the length of the body portion and a plurality of second ridge portions extending along the width of the body portion. The plurality of second ridge portions intersects the plurality of first ridge portions. The plurality of first ridge portions and the plurality of second ridge portions define a plurality of recessed portions for receiving the plurality of batteries and preventing movement of the plurality of batteries relative to the body portion. The body portion may preferably be a planar member, and may preferably have a rectangular shape. Each of the plurality of recessed portions may also have a rectangular shape. The body portion may preferably include a perimeter portion, and a plurality of openings may preferably be formed in the perimeter portion. The body portion may preferably be comprised of plastic. The plurality of second ridge portions may preferably be substantially perpendicular to the plurality of first ridge portions. The body portion may preferably be comprised of a single piece of material.

Another aspect of the invention provides a system for receiving and retaining a plurality of batteries in a vehicle. A battery tray includes a body portion having a length and a width. The body portion includes a plurality of first ridge portions extending along the length of the body portion and a plurality of second ridge portions extending along the width of the body portion. The plurality of second ridge portions intersects the plurality of first ridge portions. The plurality of first ridge portions and the plurality of second ridge portions define a plurality of recessed portions for receiving and retaining the plurality of batteries. A host tray includes at least one recessed portion. The body portion of the battery tray is received in the recessed portion of the host tray to prevent movement of the body portion relative to the host tray. The body portion is fastened to the host tray. A first bracket member and a second bracket member may also be provided. The first bracket member is attached to a first side of the body portion, and the second bracket member is attached to a second side of the body portion to prevent horizontal movement of the plurality of batteries. A plurality of retainer members may also be provided. The plurality of retainer members is attached to the first bracket member and to the second bracket member. The plurality of retainer members extend from the first bracket member to the second bracket member to prevent vertical movement of the plurality of batteries. The host tray may preferably be comprised of a composite material, and may preferably have a generally rectangular shape. The host tray may preferably be a planar member. The recessed portion of the host tray may preferably have a rectangular shape. The recessed portion of the host tray may also preferably include a plurality of openings to allow the body portion to be secured to the recessed portion. The host tray may preferably include a perimeter portion and a plurality of openings may be formed in the perimeter portion to allow the host tray to be attached to a vehicle.

Another aspect of the invention provides a method of retaining a plurality of batteries. A body portion including a length and a width is provided. The body portion includes a plurality of first ridge portions extending along the length of the body portion and a plurality of second ridge portions that extending along the width of the body portion. The plurality of second ridge portions intersects the plurality of first ridge portions. The plurality of first ridge portions and the plurality of second ridge portions define a plurality of recessed portions. The plurality of batteries is inserted into the plurality of recessed portions, and movement of the plurality of batteries relative to the body portion is prevented.

Another aspect of the invention provides a method of retaining a plurality of batteries. A battery tray including a body portion is provided. The body portion includes a length and a width. The body portion also includes a plurality of first ridge portions extending along the length of the body portion and a plurality of second ridge portions extending along the width of the body portion. The plurality of second ridge portions intersects the plurality of first ridge portions. The plurality of first ridge portions and the plurality of second ridge portions define a plurality of recessed portions for receiving and retaining the plurality of batteries. A host tray includes at least one recessed portion of the host tray. The body portion of the battery tray is inserted into the recessed portion of the host tray. The body portion is fastened to the host tray, and movement of the body portion relative to the host tray is prevented. A first bracket member and a second bracket member may also be provided. The first bracket member may preferably be attached to a first side of the body portion. The second bracket member may preferably be attached to a second side of the body thereby preventing horizontal movement of the plurality of batteries. A plurality of retainer members extending from the first bracket member to the second bracket member may also be provided. The plurality of retainer members may preferably be attached to the first bracket member and to the second bracket member to prevent vertical movement of the plurality of batteries.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
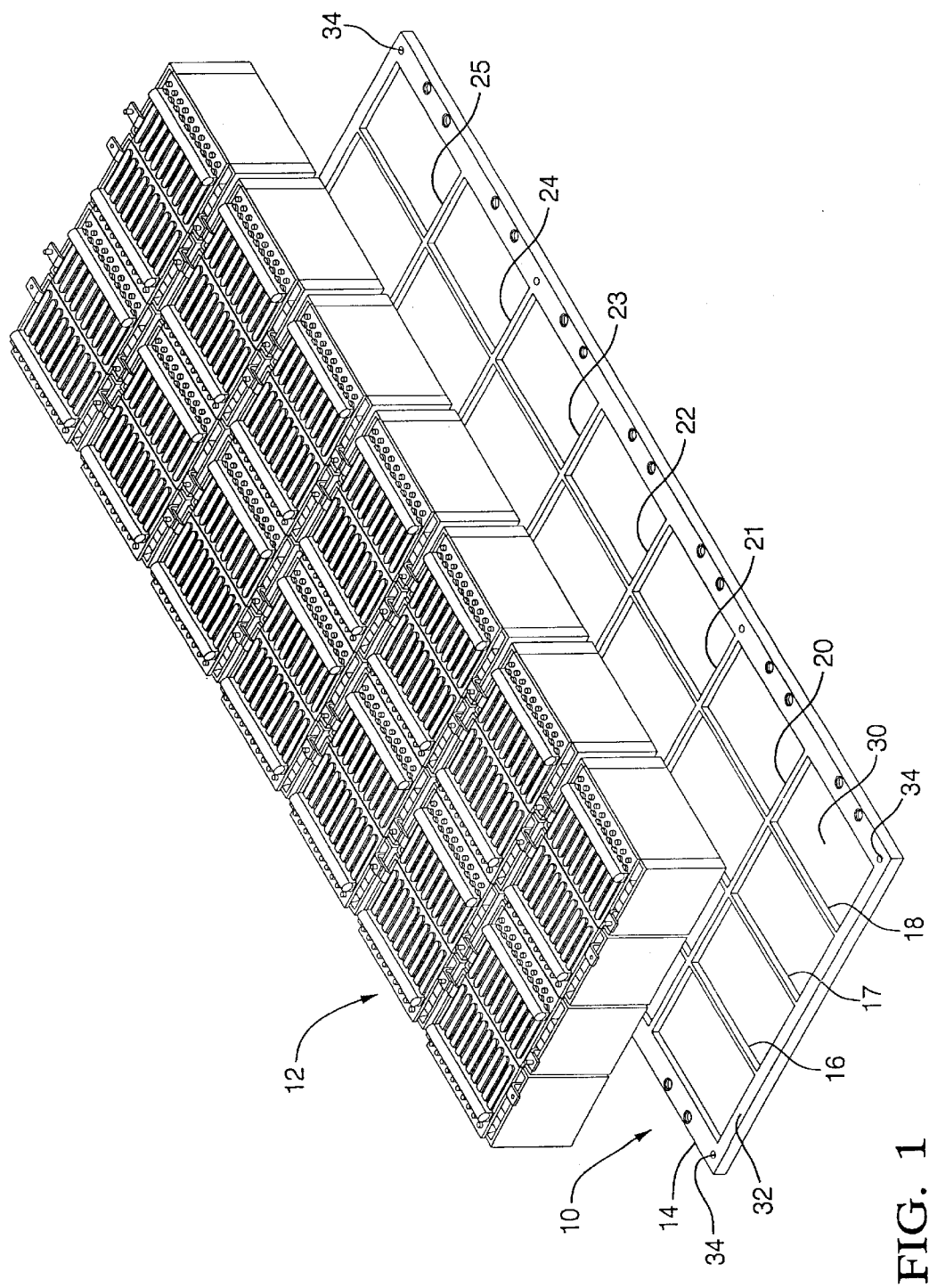
FIG. 1 is perspective view of a preferred embodiment of a battery tray that is made in accordance with the invention showing a plurality of batteries exploded from the battery tray.

FIG. 1 is a perspective view of a battery tray 10 for receiving and retaining a plurality of batteries 12. The batteries 12 may preferably be any of the conventional batteries suitable for providing an energy source for a vehicle such as, for example, an electric/hybrid vehicle.

Figure 2:
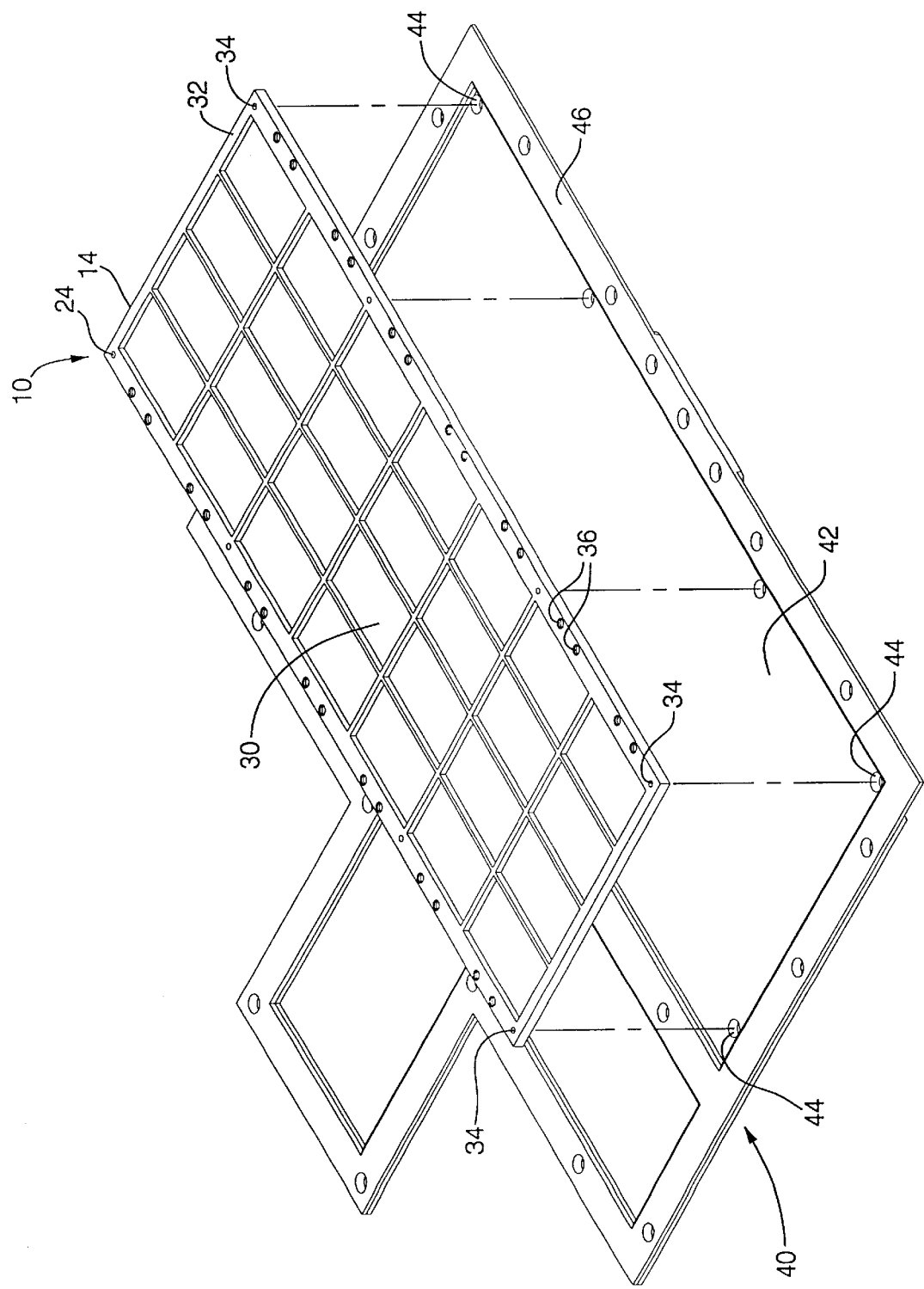
FIG. 2 is a perspective view of the battery tray of FIG. 1 exploded from a host tray made in accordance with the invention.
Figure 3:
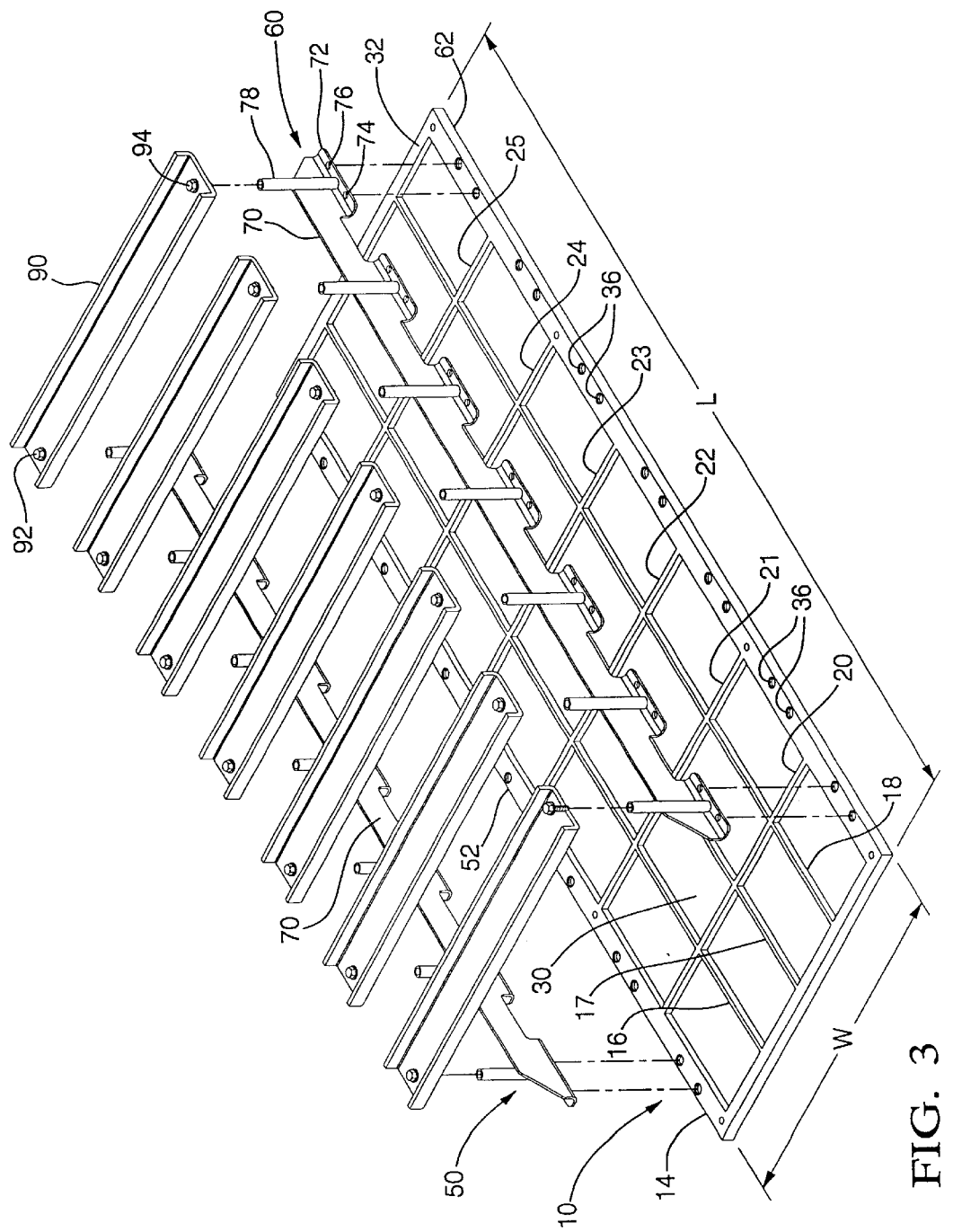
FIG. 3 is a perspective view of the battery tray of FIG. 1 showing first and second bracket members and a plurality of retaining members exploded from the battery tray.

As shown in FIGS. 1–3, and in particular FIG. 3, the battery tray 10 includes a body portion 14 having a length (L) and a width (W). The body portion 14 includes a plurality of first ridge portions, 16, 17, 18 that extend along the length of the body portion and a plurality of second ridge portions 20, 21, 22, 23, 24, 25 that extend along the width of the body portion 14. The number of first ridge portions 16, 17, 18 and the number of second ridge portions 20, 21, 22, 23, 24, 25 may vary depending upon the number of batteries to be retained. In the embodiment shown, the plurality of second ridge portions 20, 21, 22, 23, 24, 25 intersects the plurality of first ridge portions 16, 17, 18. The plurality of second ridge portions 20, 21, 22, 23, 24, 25 may preferably be oriented substantially perpendicular to the plurality of first ridge portions 16, 17, 18.

As shown in FIGS. 1–3, the plurality of first ridge portions 16, 17, 18 and the plurality of second ridge portions 20, 21, 22, 23, 24, 25 define a plurality of recessed portions 30 for receiving the plurality of batteries 12. This arrangement prevents movement of the plurality of batteries 12 relative to the body portion 14.

In the embodiment shown in FIGS. 1–3, the body portion 14 of the battery tray 10 is a generally planar member and has a rectangular shape, although other shapes ands configurations are contemplated. Each of the plurality of recessed portions 30 also has a rectangular shape. The shape and configuration of the recessed portions 30 may vary depending upon the shape and configuration of the batteries 12. The body portion 14 includes a perimeter portion 32 that extends around the recessed portions 30. As shown in FIGS. 1 and 2, a plurality of openings 34 may preferably be formed in the perimeter portion 32. In the embodiment shown, the openings 34 are formed in each corner of the battery tray 10. Referring again to FIG. 2, the openings 34 are formed to allow the battery tray 10 to be mounted to a host tray 40, which will be described in greater detail below. Pairs of openings 36 may also be spaced apart along the perimeter portion 32. As shown in FIG. 3, the pairs of openings 36 allow a first bracket member 50 and a second bracket member 60 to be mounted to the perimeter portion 32 of the battery tray 10. The body portion 14 of the battery tray 10 may preferably be comprised of plastic, or any other suitable rigid material. In the embodiment shown, the body portion 14 may preferably be comprised of a single piece of material.

The battery tray 10 may preferably be used in conjunction with the host tray 40 to create a system for receiving and retaining the plurality of batteries 12. As shown in FIG. 2, the host tray 40 includes at least one recessed portion 42. The body portion 14 of the battery tray 10 is received in the recessed portion 42. The nesting of body portion 14 of the battery tray 10 into the recessed portion 42 prevents movement of the body portion 14 relative to the host tray 40. The body portion 14 may preferably be fastened to the host tray 40.

The host tray 40 may preferably be comprised of a lightweight composite material. The host tray 40 may preferably be a planar member, and may preferably have a generally rectangular shape, although other shapes and configurations are contemplated. Referring again to FIG. 2, the recessed portion 42 may preferably be configured to receive the battery tray 10. In the embodiment shown, the recessed portion 42 therefore has a rectangular shape to coincide with the rectangular shape of the battery tray 10. The recessed portion 42 of the host tray 40 may preferably include a plurality of openings 44 to allow the body portion 14 of the battery tray 10 to be secured to the recessed portion 42. In the embodiment shown, the openings 44 are located at the corners of the recessed portion 42. The host tray 40 may preferably include a perimeter portion 46. A plurality of openings 48 may be formed in the perimeter portion and spaced along the perimeter portion 46 to allow the host tray 40 to be attached to a vehicle (not shown).

As shown in FIG. 3, the first bracket member 50 may preferably be attached to a first side 52 of the body portion 14. The second bracket member 60 may preferably be attached to a second side 62 of the body portion 14. The first and second brackets 50, 60 prevent horizontal movement of the plurality of batteries 12.

In the embodiment shown in FIG. 3, the first bracket 50 and the second bracket 60 may preferably have the same configuration. Each bracket 50, 60 may preferably include a retaining portion 70 that that extends along the length of the body portion 14 of the battery tray 10. The retaining portion 70 encloses the plurality of batteries 12 to prevent horizontal movement of the batteries 12. Each of the first and second brackets 50, 60 may also include a plurality of flange portions 72 that extend outward perpendicular from the retaining portion 70. Each flange portion 72 includes a pair of openings 74, 76 to allow the flange portion 72 to be fastened to the battery tray 10. In the embodiment show, the flange portions 72 are spaced apart along the retaining portion 70. A guidepost 78 may preferably extend upward perpendicular from each of the flange portions 72. The guidepost 78 may preferably be positioned between the pair of openings 74, 76. It should be understood that the configuration of the first and second brackets 50, 60 may vary depending upon the particular application, and various modifications are contemplated.

Referring again to FIG. 3, a plurality of retainer members 90 may also be provided. The plurality of retainer members 90 may preferably be attached to the first bracket member 50 and to the second bracket member 60. In the embodiment shown, the retainer members 90 are U-shaped members having openings 92, 94 at each end. The openings 92, 94 receive the guideposts 78 that extend from the flange portions 72. As shown in FIG. 3, the plurality of retainer members 90 extend across from the first bracket member 50 to the second bracket member 60. The retainer members 90 prevent vertical movement of the plurality of batteries 12.

The apparatus shown in FIGS. 1–3 may be used for retaining a plurality of batteries 12. A plurality of batteries 12 are inserted into the plurality of recessed portions 30 in the battery tray 10. This prevents movement of the plurality of batteries 12 relative to the body portion 14 of the battery tray 10. The body portion 14 of the battery tray 10 is then inserted into the recessed portion 42 of the host tray 40. The body portion 14 of the battery tray is then fastened to the host tray 40. This arrangement prevents movement of the body portion 14 relative to the host tray 40. The first bracket member 50 may preferably be attached to the first side 52 of the body portion 14, and the second bracket 60 member may preferably be attached to a second side 62 of the body portion 14. This arrangement prevents horizontal movement of the plurality of batteries 12. The plurality of retainer members 90 may preferably be attached to the first bracket member 50 and to the second bracket member 60 to prevent vertical movement of the plurality of batteries 12.

The apparatus described above provides a cost-effective solution for retaining a large number of batteries without high costs associated with conventional multi-piece advanced composite structures. For example, the battery tray 10 provides increased rigidity as compared to conventional multi-piece structures. Moreover, the battery tray 10 and host tray 40 arrangement reduces the number of lap joints required between materials and the number of holes required in the materials, which also results in increased rigidity. This in turn ensures that the batteries 12 are accurately retained in the desired position. The battery tray 10 and host tray 40 arrangement also decreases the cost and labor associated with conventional multi-piece structures made from advanced composite materials. In particular, the host tray 40 described above is basically "featureless," and has a relatively simple geometry. As a result, the host tray 40 can be fabricated with advanced composite materials at a much lower cost. Finally, the batteries 12 can be attached to battery tray 10, and the battery tray 10 can in turn be mounted to the host tray 40 quickly and easily, which reduces the overall cost of the vehicle.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A battery tray apparatus for receiving and retaining a plurality of batteries comprising:

a body portion including a length and a width, the body portion including a plurality of first ridge portions extending along the length of the body portion, the body portion including a plurality of second ridge portions extending along the width of the body portion, the plurality of second ridge portions intersecting the pluxalit of first ridge portions, the plurality of first ridge portions and the plurality of second ridge portions defining a plurality of recessed portions for receiving the plurality of batteries and preventing movement of the plurality of batteries relative to the body portion;

a first bracket member and a second bracket member including guideposts, the first bracket member attached to a first side of the body portion, the second bracket member attached to a second side of the body portion to prevent horizontal movement of the plurality of batteries; and a plurality of retainer members, the plurality of retainer members attached to the guideposts of the first bracket member and the second bracket member, the plurality of retainer members extending from the guideposts of the first bracket member to the guideposts of the second bracket member to prevent vertical movement of the batteries.

2. The apparatus of claim 1 wherein the body portion is a planar member.

3. The apparatus of claim 1 wherein the body portion has a rectangular shape.

4. The apparatus of claim 1 wherein each of the plurality of recessed portions has a rectangular shape.

5. The apparatus of claim 1 wherein the body portion includes a perimeter portion, a plurality of openings formed in the perimeter portion.

6. The apparatus of claim 1 wherein the body portion is comprised of plastic.

7. The apparatus of claim 1 wherein the plurality of second ridge portions are substantially perpendicular to the plurality of first ridge portions.

8. The apparatus of claim 1 wherein the body portion is comprised of a single piece of material.

9. A system for receiving and retaining a plurality of batteries in a vehicle comprising:

a battery tray including a body portion, the body portion including a length and a width, the body portion including a plurality of first ridge portions extending along the length of the body portion, the body portion including a plurality of second ridge portions extending along the width of the body portion, the plurality of second ridge portions intersecting the plurality of first ridge portions, the plurality of first ridge portions and the plurality of second ridge portions defining a plurality of recessed portions for receiving and retaining the plurality of batteries, a host tray including at least one recessed portion, the body portion of the battery tray received in the at least one recessed portion to prevent movement of the body portion relative to the host tray, the body portion fastened to the host tray;

a first bracket member and a second bracket member including guideposts, the first bracket member attached to a first side of the body portion, the second bracket member attached to a second side of the body portion to prevent horizontal movement of the plurality of batteries; and a plurality of retainer members, the plurality of retainer members attached to the guideposts of the first bracket member and the second bracket member, the plurality of retainer members extending from the guideposts of the first bracket member to the guideposts of the second bracket member to prevent vertical movement of the batteries.

10. The system of claim 9 wherein the host tray is comprised of a composite material.

11. The system of claim 9 wherein the host tray has a generally rectangular shape.

12. The system of claim 9 wherein the at least one recessed portion has a rectangular shape.

13. The system of claim 9 wherein the host tray is a planar member.

14. The system of claim 9 wherein the at least one recessed portion of the host tray includes a plurality of openings to allow the body portion to be secured to the at least one recessed portion.

15. The system of claim 9 wherein the host tray includes a perimeter portion, a plurality of openings formed in the perimeter portion to allow the host tray to be attached to a vehicle.

* * * * *